DISCONNECT SWITCH FOR A HIGH VOLTAGE BUS STRUCTURE

Original Filed Sept. 13, 1956 8 Sheets-Sheet 1

INVENTOR.
ROY H. ALBRIGHT
BY Ostrolenk, Faber, Gerb & Soffen
ATTORNEYS

Nov. 8, 1960 R. H. ALBRIGHT 2,959,657

DISCONNECT SWITCH FOR A HIGH VOLTAGE BUS STRUCTURE

Original Filed Sept. 13, 1956 8 Sheets-Sheet 2

INVENTOR.
ROY H. ALBRIGHT
BY Ostrolenk, Faber, Gerb & Soffen
ATTORNEYS

DISCONNECT SWITCH FOR A HIGH VOLTAGE BUS STRUCTURE

Original Filed Sept. 13, 1956

INVENTOR.
ROY H. ALBRIGHT
BY Ostrolenk, Faber, Gerb & Soffen
ATTORNEYS

INVENTOR.
ROY H. ALBRIGHT

BY Ostrolenk, Faber, Gerb & Soffen
ATTORNEYS

DISCONNECT SWITCH FOR A HIGH VOLTAGE BUS STRUCTURE

Original Filed Sept. 13, 1956

8 Sheets-Sheet 5

INVENTOR.
ROY H. ALBRIGHT

BY Ostrolenk, Faber, Gerb & Soffen
ATTORNEYS

INVENTOR.
ROY H. ALBRIGHT
BY Ostrolenk, Faber, Gerb & Soffen
ATTORNEYS

DISCONNECT SWITCH FOR A HIGH VOLTAGE BUS STRUCTURE

Original Filed Sept. 13, 1956 8 Sheets-Sheet 7

INVENTOR.
ROY H. ALBRIGHT
BY Ostrolenk, Faber, Gerb & Soffen
ATTORNEYS

Nov. 8, 1960 R. H. ALBRIGHT 2,959,657

DISCONNECT SWITCH FOR A HIGH VOLTAGE BUS STRUCTURE

Original Filed Sept. 13, 1956

8 Sheets-Sheet 8

INVENTOR.
ROY H. ALBRIGHT

BY Ostrolenk, Faber, Gerb & Soffen
ATTORNEYS

United States Patent Office 2,959,657

Patented Nov. 8, 1960

2,959,657

DISCONNECT SWITCH FOR A HIGH VOLTAGE BUS STRUCTURE

Roy H. Albright, Greensburg, Pa., assignor to I-T-E Circuit Breaker Company, Philadelphia, Pa., a corporation of Pennsylvania

Original application Sept. 13, 1956, Ser. No. 609,744, now Patent No. 2,944,101, dated July 5, 1960. Divided and this application Dec. 31, 1957, Ser. No. 706,396

5 Claims. (Cl. 200—163)

This application is a division of my copending application 609,744, filed September 13, 1956 now Pat. No. 2,944,101, July 5, 1960 and assigned to the assignee of the instant invention.

My invention relates to a high voltage bus structure and more specifically is directed to a disconnect switch for a metal enclosed isolated phase bus structure that can support voltages of the order of 138,000 volts.

The trend in electrical industry has been to utilize higher and higher voltages in distribution systems. At the present time, high voltage isolated phase bus structures are available which have voltage ratings up to and including sixty-nine kilovolts. In constructing metal enclosed isolated phase bus structures of this rating, previously known bus structures were utilized and the physical dimensions thereof were increased so as to meet the increased dielectric requirements.

However, this approach may not be utilized in the construction of a bus structure which must support one hundred thirty eight kilovolts, since the greatly increased physical separation of the bus and its metal enclosure brings about many structural problems in supporting the bus and the enclosure. Some of the problems associated with the bus housing construction introduced in view of the required increase in physical dimensions of a bus which will support one hundred thirty eight kilovolts are the torsional deflection in structural supporting members, methods for supporting the bus structure enclosure, and method for aligning the ends of adjacent enclosures so that they may be fastened to one another.

Other problems are introduced with respect to the actual fastening between adjacent housings so as to include gasket seals and insulation between adjacent enclosures which will allow for large changes in dimension between adjacent enclosures due to thermal expansion and contraction and to provide protection for the gaskets and the insulation.

A still further set of problems are introduced in the construction of the insulator supports which support the bus within the housing. That is, an insulator which is loaded in compression but still allows freedom of movement to compensate for different rates of expansion and contraction of enclosures and conductors is required. This problem is particularly severe in the case of a one hundred thirty eight kilovolt bus structure since the insulator supports are extremely long and stresses resulting from cantilever loadings thereon are much higher than those that have been previously encountered in lower voltage rating bus structures.

A still further problem encountered is that of corona discharge at the disconnect switch within the metal enclosed bus structure in view of the higher voltage rating.

It is therefore a primary object of my invention to provide a novel bus structure for a metal enclosed isolated phase bus which will satisfy each of the above noted problems and particularly the last problem for the case of a one hundred thirty eight kilovolt and higher bus structure while still being capable of being used in the lower voltage ratings such as sixty nine kilovolts.

In providing a disconnect switch for a one hundred thirty eight thousand volt bus structure, the danger of corona discharge is considerably increased. I therefore provide a novel disconnect switch for a high voltage bus which is supported in a bus housing of the type to be hereinafter described and is connected to adjacent bus housings. The switch current carrying parts are modified by placing corona rings on both the movable switch members and the stationary switch members so as to reduce corona discharge and raise the insulation level. These corona rings are arranged on each side of each set of insulators so as to shield conductor parts, blade parts, and insulator saddles supporting these parts. The corona rings are further constructed to have large radii so as to reduce the intensity of the electric field at the surface of the rings and the rings are made concentric so that a uniform electrical field exists at their periphery.

Similarly, all sharp or small radii projections are substantially eliminated in the switch so as to avoid local high intensity electric fields.

Accordingly, another object of my invention is to provide a novel disconnect switch for a high voltage bus structure.

Another object of my invention is to place corona rings on the switch blade and the stationary conductors of the disconnect switch of a high voltage bus structure so as to reduce corona discharge and raise the insulation level.

Another object of my invention is to provide novel means for connecting a disconnect switch to a high voltage bus structure.

These and other objects of my invention will become apparent when taken in conjunction with the drawings in which.

Figures 4, 9, 12:
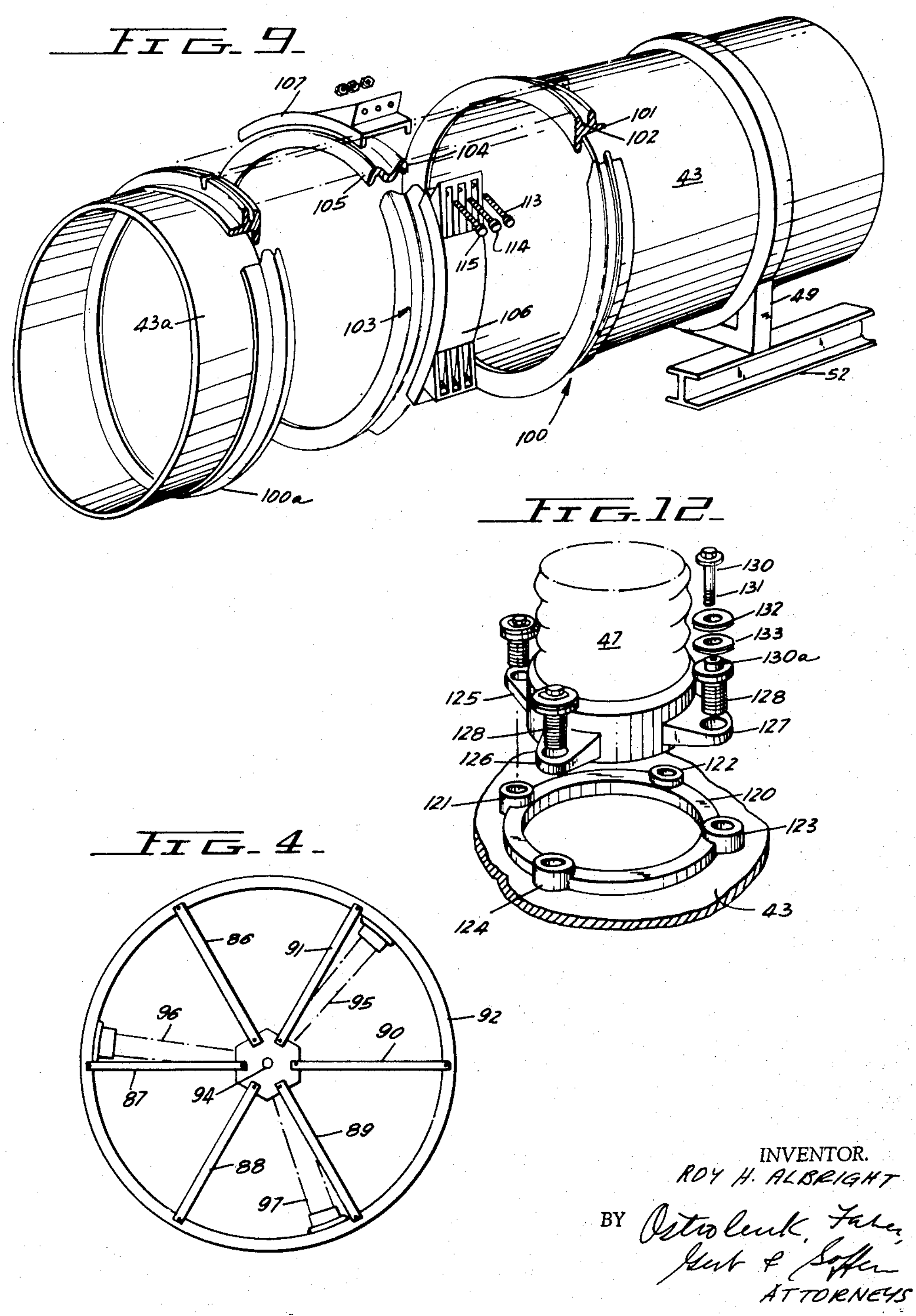
Figure 4 shows a front view of a bus housing wherein a bracing member is connected at its end so as to facilitate alignment of adjacent bus members and to further reinforce the bus housing particularly during transportation thereof.
Figure 9 is an exploded perspective view of a portion of the bus housing specifically illustrating the manner in which adjacent buses are connected together.
Figure 10:
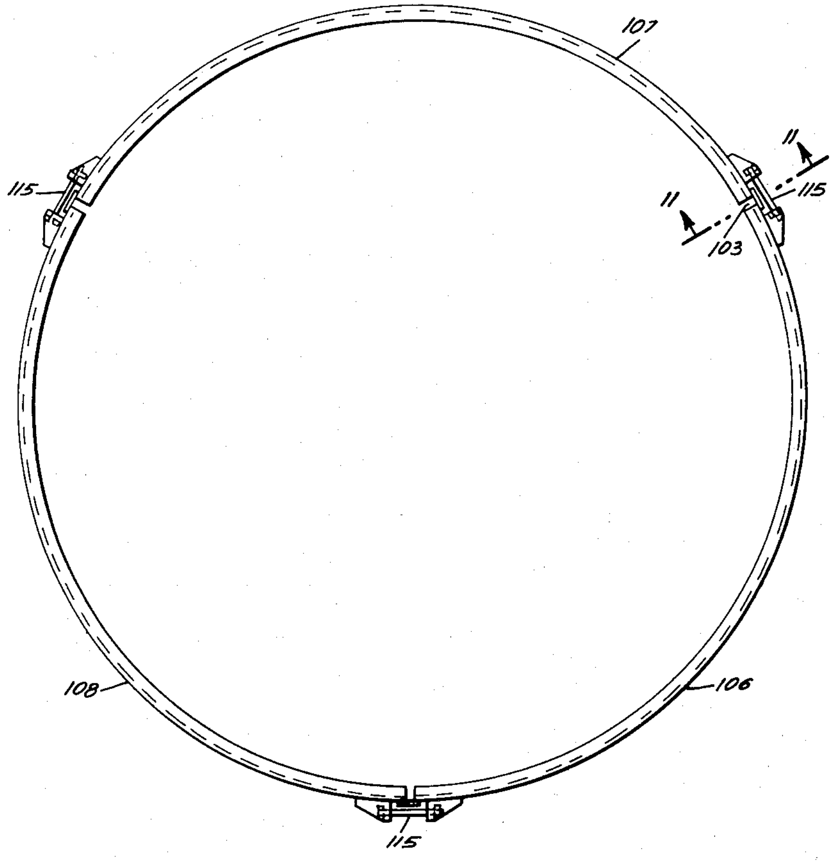
Figure 10 is a front cross-sectional view taken through the point of junction between adjacent bus housings.
Figure 11:
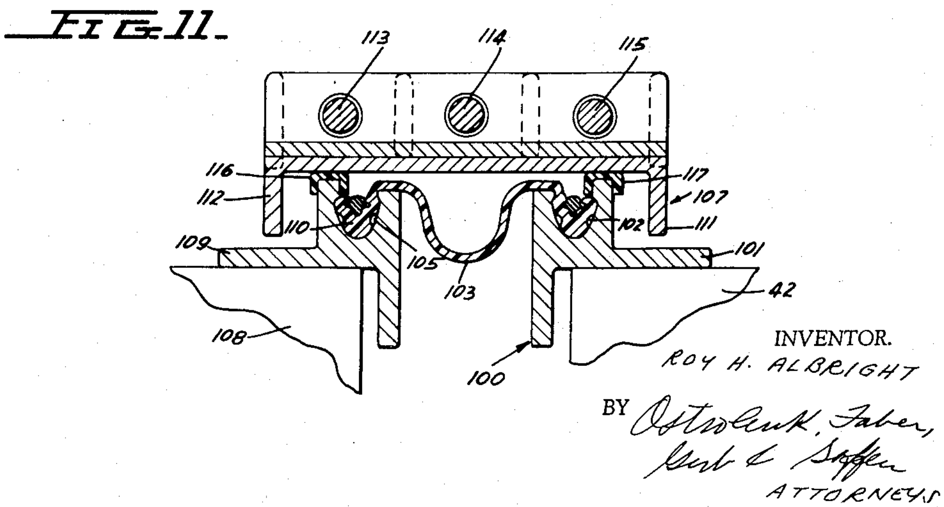

Figure 11 is a view of Figure 10 when taken across the lines 11—11 and specifically illustrates the configuration of the member fastened to the end of each housing for reinforcing its corresponding housing and accepting the gasket connection and the mechanical clamping connection, Figure 12 is a fragmentary perspective view showing the manner in which the insulator support is attached to a cooperating support which is an integral part of the interior of the bus housing.

Figure 13:
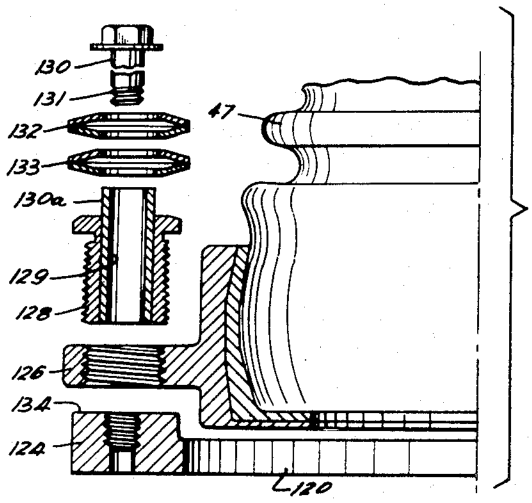

Figure 13 is an exploded side cross-sectional view which indicates the manner in which my novel flexible connection between the insulator and the housing is achieved.

Figure 14:
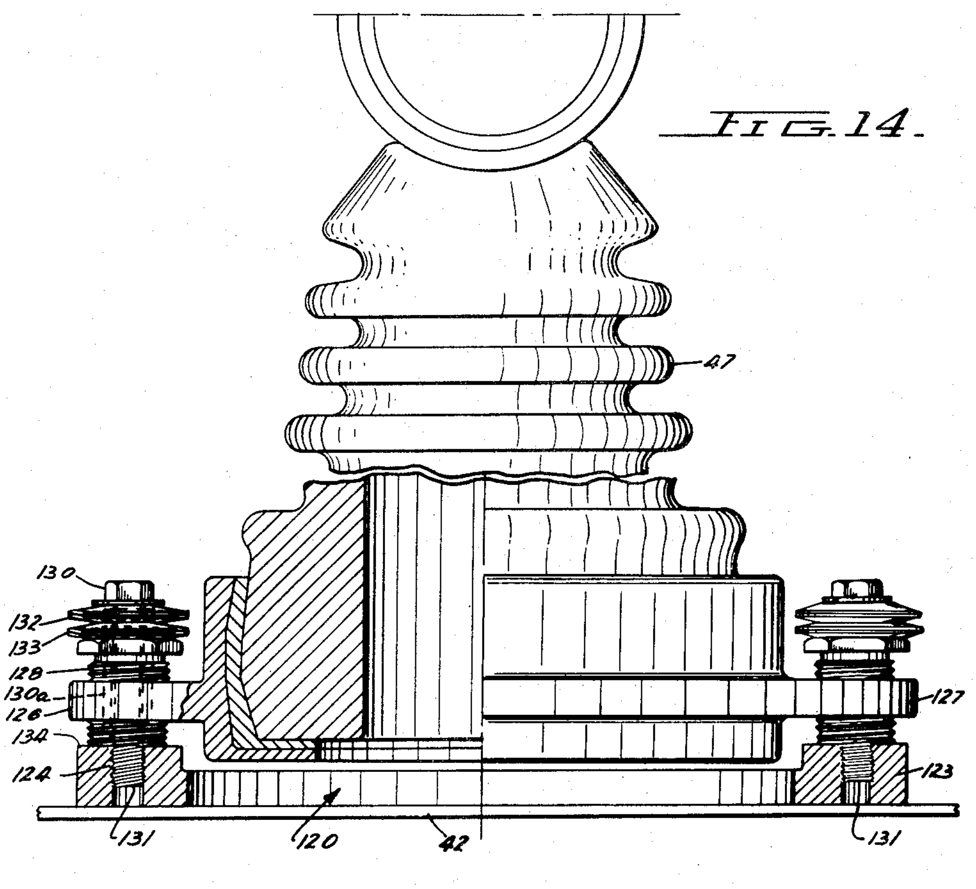

Figure 14 is a cross-sectional view showing the complete support for a single insulator.

Figure 15:
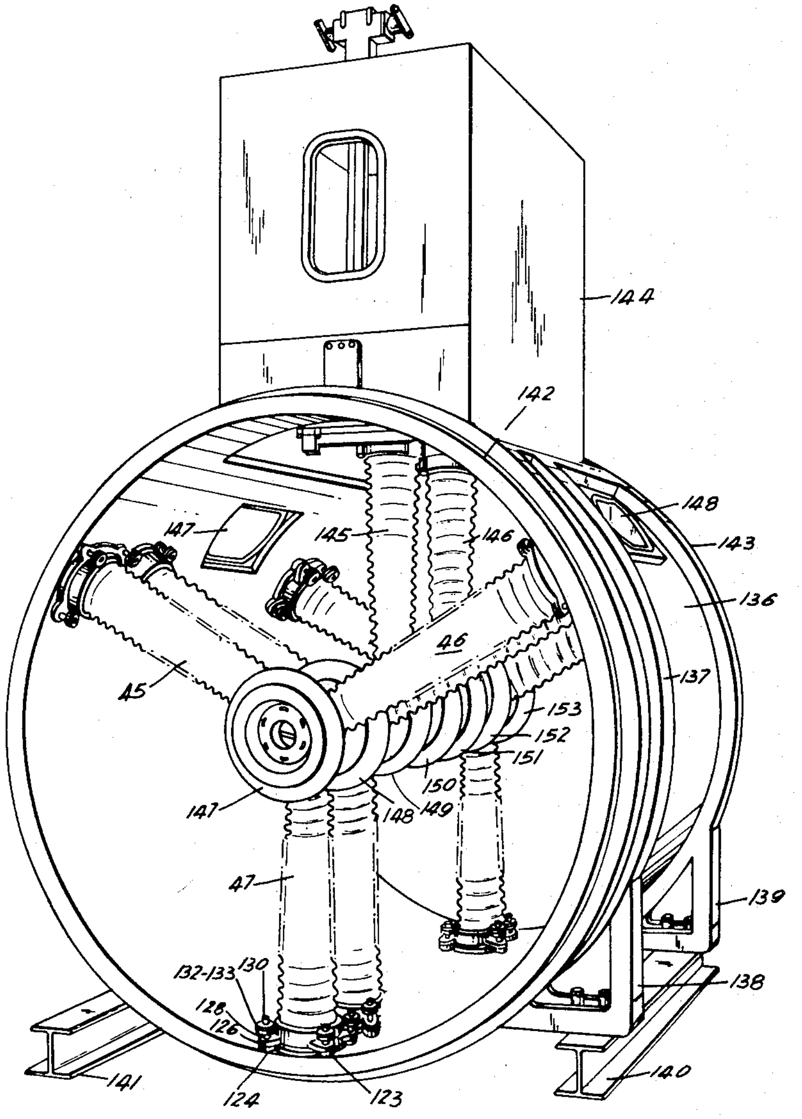

Figure 15 is a perspective view of my novel disconnect switch and the manner in which it is housed within my novel high voltage bus structure.

Figure 16:
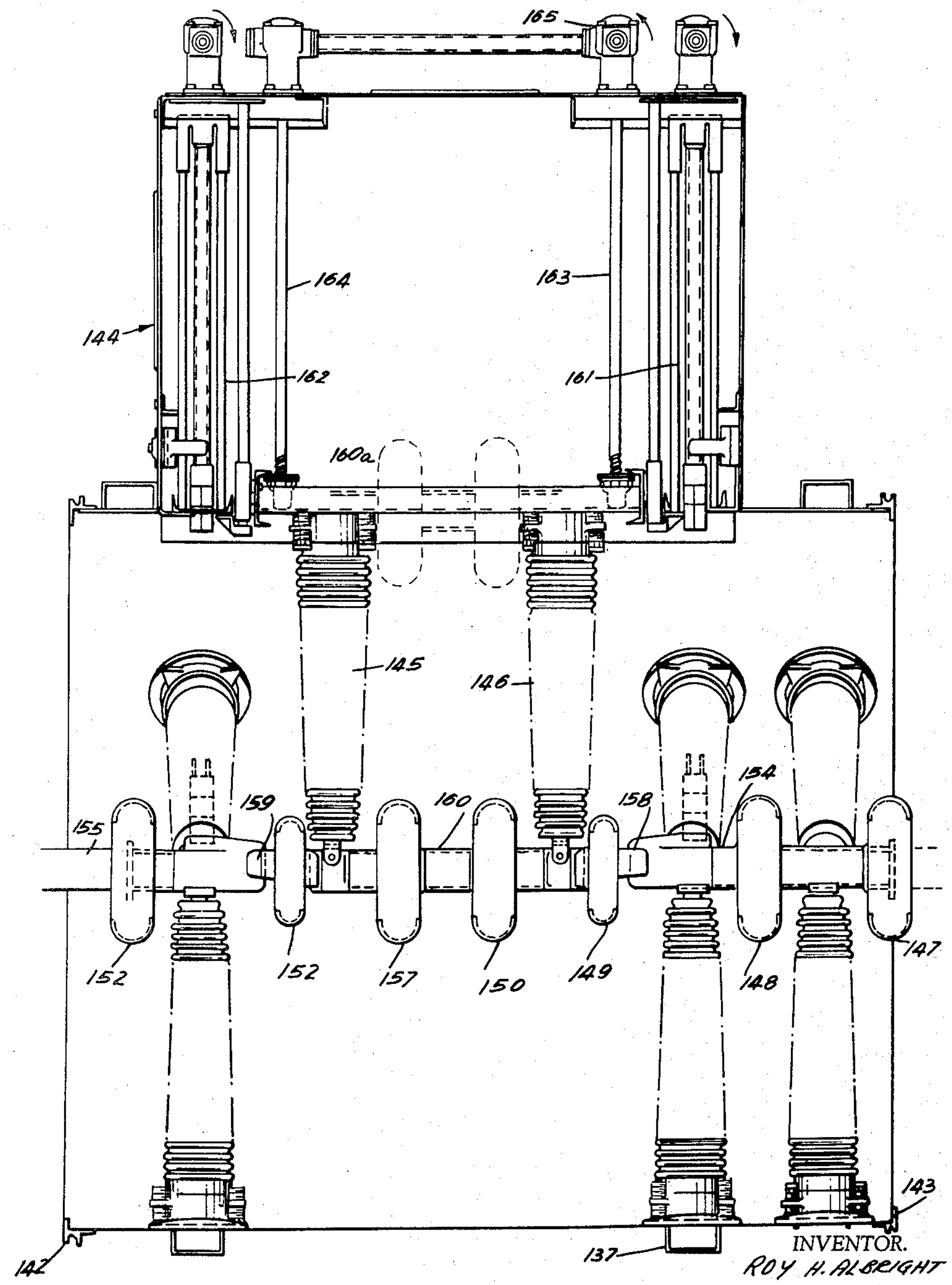

Figure 16 is a side view of the disconnect switch of Figure 15.

Figure 17:
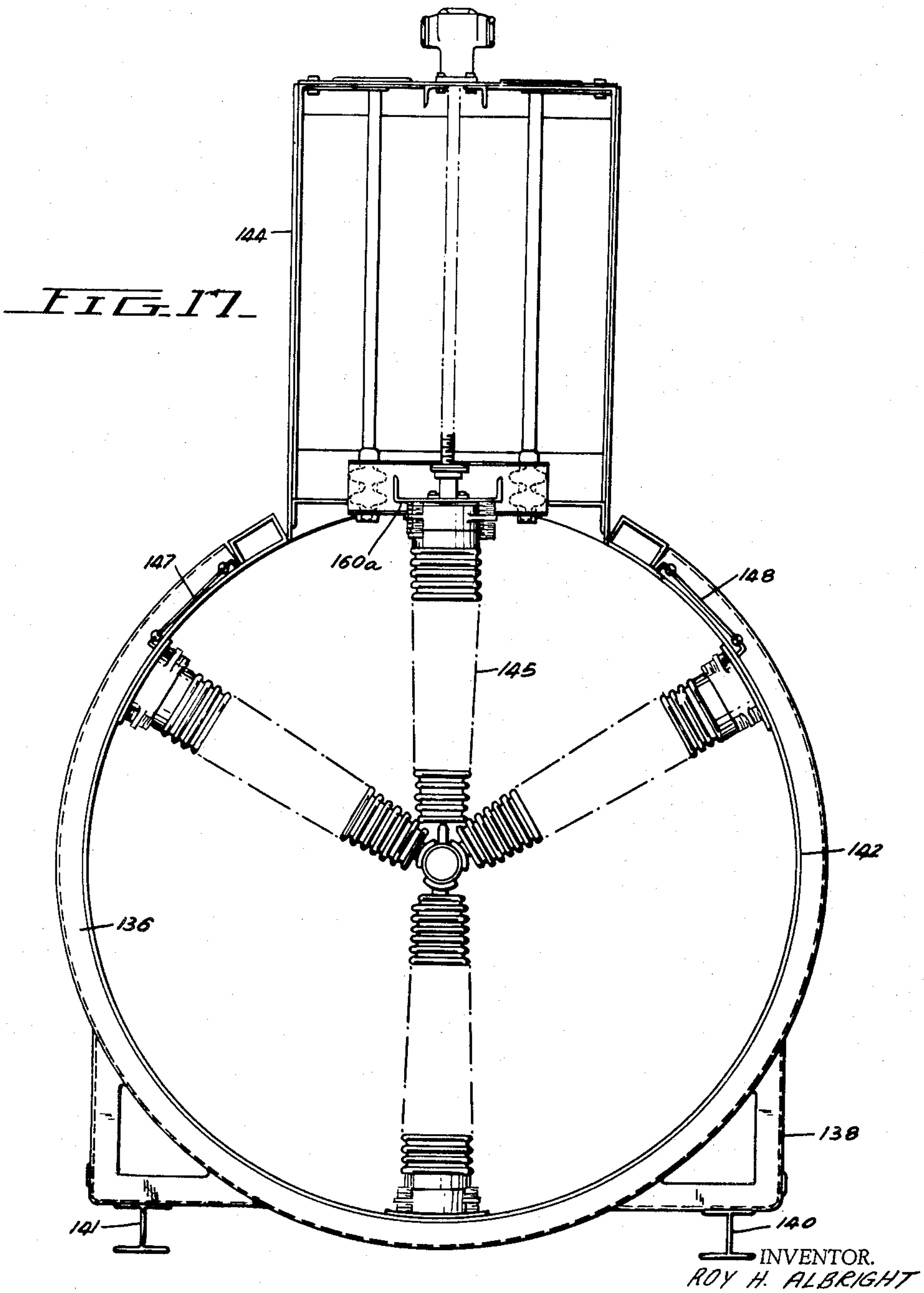

Figure 17 is a front view of the disconnect switch of Figure 15.

*Housing construction*

The housing construction of my novel high voltage bus structure which is capable of voltage ratings of the order of 138,000 volts is most clearly seen in connection with Figures 1 through 8.

Figure 1:
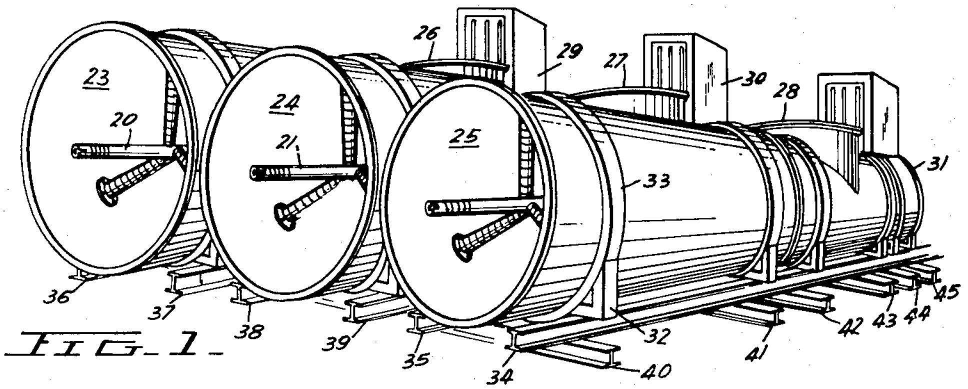
Figure 1 is a perspective view of three metal enclosed isolated phase buses which could conduct three phase alternating current.

Referring first to Figure 1, a three phase isolated phase bus system is seen as comprising the buses 20, 21 and 22 which are isolated from one another by their metallic housings 23, 24 and 25 respectively. While Figure 1 shows a three phase system, it is to be understood that my novel bus construction could be used for any type system using a housed or enclosed bus. Each of the bus housings 23, 24 and 25 are metallic cylinders which could have been formed of welded semi-cylindrical members. In view of their extremely high voltage rating, which could be of the order of 138,000 volts, these housings are flexible and in further view of their large size, manufacturing tolerances cannot be held as well as in the case of smaller bus housings so that they may not be of uniform size or shape.

A second bus housing section is then attached to bus housings 23, 24 and 25 and comprises the T-housings 26, 27 and 28 respectively which allow for a T-connection or, more generally, for a change in the direction of buses 20, 21 and 22. So that the structure of Figure 1 may be generalized, still another housing section comprising the disconnect switches 29, 30 and 31 is then seen as being connected to bus housings 26, 27 and 28 respectively.

It is to be understood that in a complete bus distribution system that many straight through bus housings such as housings 23, 24 and 25 will be connected adjacent one another so as to effect the desired power distribution and bus housings for changing the direction of the bus such as the T-shaped housings 26, 27 and 28 will be utilized in conjunction therewith. Similarly, disconnect switches such as switches 29, 30 and 31 will be placed where desired.

In order to provide mounting of the bus housings, the bus housing 25 of Figure 1 has a mounting foot 32 attached thereto which is secured to the annular shaped reinforcing member 33 of the housing 25. In a like manner, other mounting feet 32 are provided along the bus housing. Although it cannot be seen in Figure 1, each of the bus housings 23 and 24 are provided with mounting feet similar to the mounting feet 22 of bus housing 25. The mounting feet 32 on one side of bus housing 25 are then fastened to the longitudinal supporting member 34 while similar mounting feet on the other side of bus housing 25 are supported by longitudinal supporting member 35.

In a similar manner longitudinal supporting members 36 and 37 will support the mounting feet of housing 23 while longitudinal support members 38 and 39 will support the mounting feet of housing 24.

Each of the longitudinal mounting structures 34 through 39 are then in turn mounted to transverse supporting structures such as the I-beams 40, 41, 42 which provide the ultimate support for each of the bus housings.

Figures 2, 3:
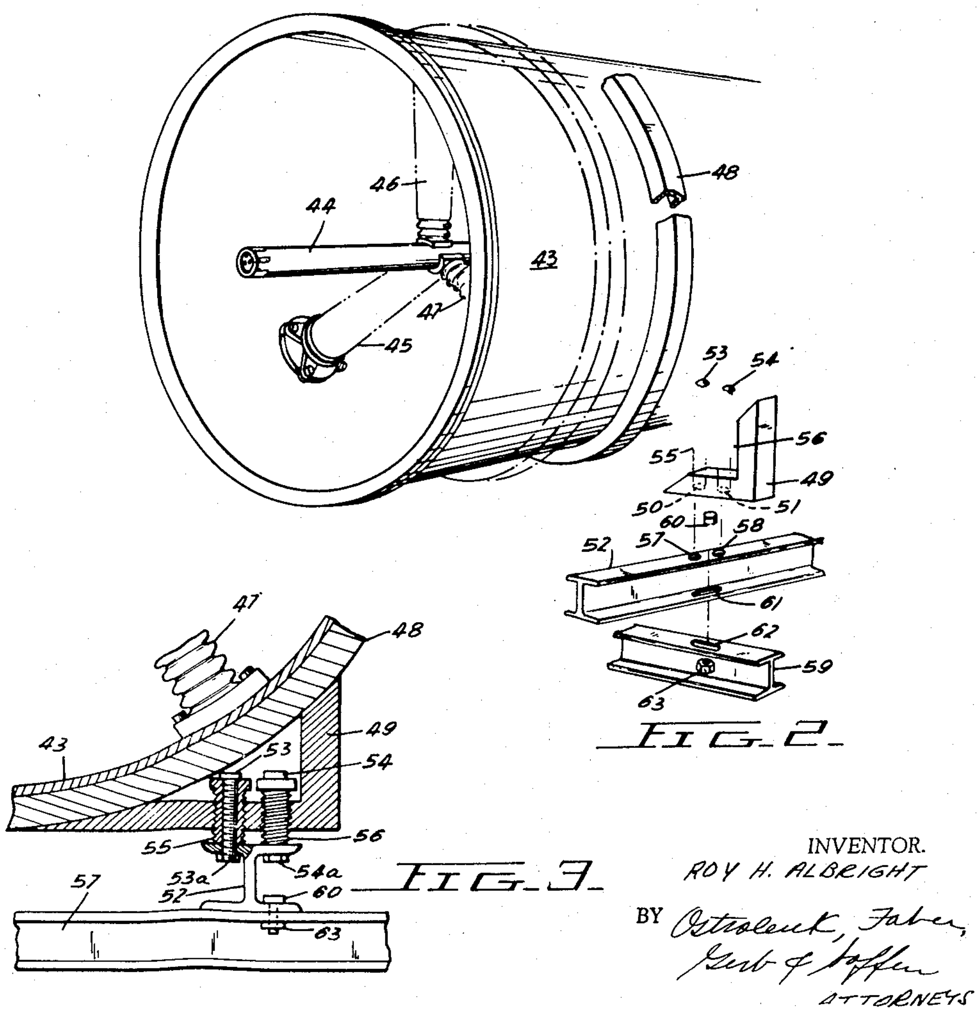
Figure 2 shows an exploded perspective view of a portion of one high voltage bus housing illustrating the manner in which the bus housing position can be varied in a longitudinal, transverse or vertical direction.
Figure 3 is a cross-sectional view taken through the mounting foot of the bus of Figures 1 and 2 and specifically illustrates the manner in which the bus may be adjustably positioned in a direction perpendicular to its axis.

Referring now to Figure 2, which shows an exploded perspective view of the end of a bus housing 43 similar to the bus housings seen in Figure 1, the bus housing 43 which is a circular metallic member supports the bus 44 internally positioned therein by means of the radially extending insulators 45, 46, and 47. In view of the required large diameter of the circular housing 43 for the extremely high voltage range in which my novel bus structure can operate, the housing 43 is relatively flexible and I therefore provide an annular shaped reinforcing member 48 of Figure 2 which when in the assembled and dotted-line position of Figure 2 is fastened to the housing in any desired manner such as welding.

Reinforcing member 48 could, if desired, be formed of two channel shaped members which have been rolled to a semi-circular form.

It is to be noted that the position at which insulators 45, 46 and 27 are connected to the housing 43 registers axially with the reinforcing member 48. Thus, reinforcing member 48 not only reinforces the relatively flexible cylinder 43 but further provides physical strength at points of connection of insulators 45, 46 and 47 which will be points of relatively high stress in the housing.

As seen in Figures 2 and 3, a mounting foot 49 is fastened to the reinforcing member 48 in any desired manner, this mounting foot 49 being a structural aluminum channel having threaded holes 50 and 51 therethrough at the base of the angle.

In a like manner, a second mounting foot is positioned on the other side of the housing 43 and is attached to the other side of reinforcing member 48 in a similar manner.

A longitudinal structural support member such as the I-beam 52 is then positioned to mount the mounting foot 49, the I-beam 52 further mounting each of the mounting feet which are longitudinally distributed along the full length of housing 43. Figure 2, however, only shows one of these mounting feet. Thus, I-beam 52 will function as did the I-beam 34 of Figure 1 in mounting each of the mounting feet 32 of the housing 25 of Figure 1.

The connection between mounting foot 49 and I-beam 52 of Figures 2 and 3 is affected by the bolts 53 and 54 which protrude through apertures in the adjusting bolts 55 and 56 to mate with openings 57 and 58 respectively in the I-beam 52 and as best seen in Figure 3, are fastened by nuts **53*a* and 54*a*** respectively.

The bolts 55 and 56 as seen in Figure 3 are in threaded engagement with apertures 50 and 51 of the mounting foot 49 and butt against the surface of I-beam 52. In view of the butting engagement between the end of bolts 55 and 56 and the surface of the I-beam 52, it is clear that by rotating bolts 55 and 56 when the nuts **53*a* and 54*a* are loosened, the distance between mounting foot 49 and supporting I-beam 52 will be varied. Thus the bolts 55 and 56 can adjustably position the bus housing 43 of Figure 2 in a direction perpendicular to the axis of housing 43**.

Thus, in operation the vertical positioning of housing 43 is first achieved through bolts 55 and 56 and the bolts 53 and 54 which are fastening bolts are then tightened in their threaded engagement with the I-beam 52 so as to maintain the mounting foot 49 in its position with respect to I-beam 52.

The longitudinal structural member 52 may then be connected to a transverse structural member which ultimately supports the complete bus housing. As may be seen in Figures 2 and 3, the longitudinal I-beam 52 is connectible to the transverse structural member or I-beam 59 by means of the bolt 60 which cooperates with slotted apertures 61 and 62 in I-beams 52 and 59 respectively. The bolt 60 may then be fastened into position by its cooperating nut 63.

Apertures 61 and 62 are seen to be slotted in perpendicular directions in Figures 2 and 3. This type of construction will therefore allow adjustment of the position of bus housing 43 in the direction of the slot 61 or the longitudinal direction as well as in the direction of slot 62 or the transverse direction. After aligning the bus both longitudinally and transversely, as desired, the bolt 60 and its cooperating nut 63 may then be tightened in place so as to maintain this positioning.

Accordingly, the structure set forth in Figures 2 and 3 will allow for longitudinal, transverse and vertical positioning of the bus housing 43. If now this specific construction of Figures 2 and 3 is provided for each bus housing of a system such as the system of Figure 1, it is clear that the bus housings may be easily and properly aligned in any direction with respect to one another.

While the above construction of Figures 2 and 3 has been set forth for the case in which the bus runs in a horizontal direction, this same novel structure is easily adapted to the case of a bus running in a vertical direction.

Figures 5, 6:
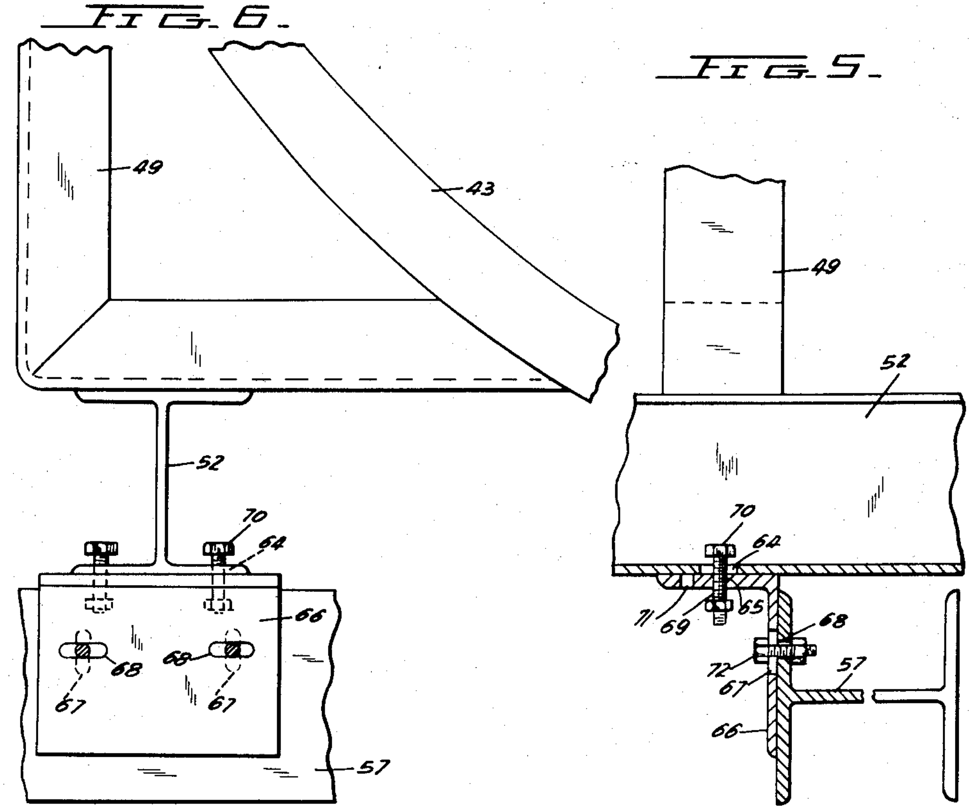
Figure 5 shows the manner in which the bus housing of my novel invention could be mounted when the bus axis is vertical.
Figure 6 is a front view of Figure 5.

Another adjustable connection for bus housing 43 and its supporting structure may be seen in Figures 5 and 6, which show a fragmentary portion of the bus housing 43 with the mounting foot 49 fastened to the I-beam 52 in any desired manner such as a bolt connection or a weld. Here again the I-beam 52 is a longitudinal structural member or a structural member which runs parallel to the axis of the bus housing. The longitudinal support member 52 is then provided with a slot 64 which cooperates with aperture 65 of the angle 66. The angle 66 is further provided with a slot 67 which cooperates with slots 68 of the transverse support member or I-beam 57.

In the construction set forth in Figures 5 and 6, longitudinal adjustment of the positioning of housing 43 is affected by the positioning of slot 64 of I-beam 52 with respect to the opening 65. Upon achieving the desired longitudinal positioning the bolt 69 and its cooperating nut 70 will lock the member 52 into the desired position with respect to angle 66. This position may be further maintained by providing an additional aperture 71 in angle 66 and to use this aperture as a guide for drilling a second hole in the I-beam 52 after positioning thereof for receiving a second and reinforcing bolt connection.

Transverse adjustment and adjustment in a direction perpendicular to the axis of the housing 43 is achieved by positioning slot 68 of this I-beam 57 with respect to the perpendicular slot 68 of the angle 66 until bus 43 is positioned in the desired transverse position and the desired position in a direction perpendicular to its axis. The bolt means 72 may then be passed through the slots 67 and 68 to maintain housing 43 in its adjusted position. Hence in the embodiment of Figures 5 and 6, three dimensional adjustment of the position of housing 43 is achieved by interposing an auxiliary angle 66 between the support member 52 and the support member 57. Clearly this same type of construction can be utilized for both horizontal and vertical running bus systems.

Figures 7, 8:
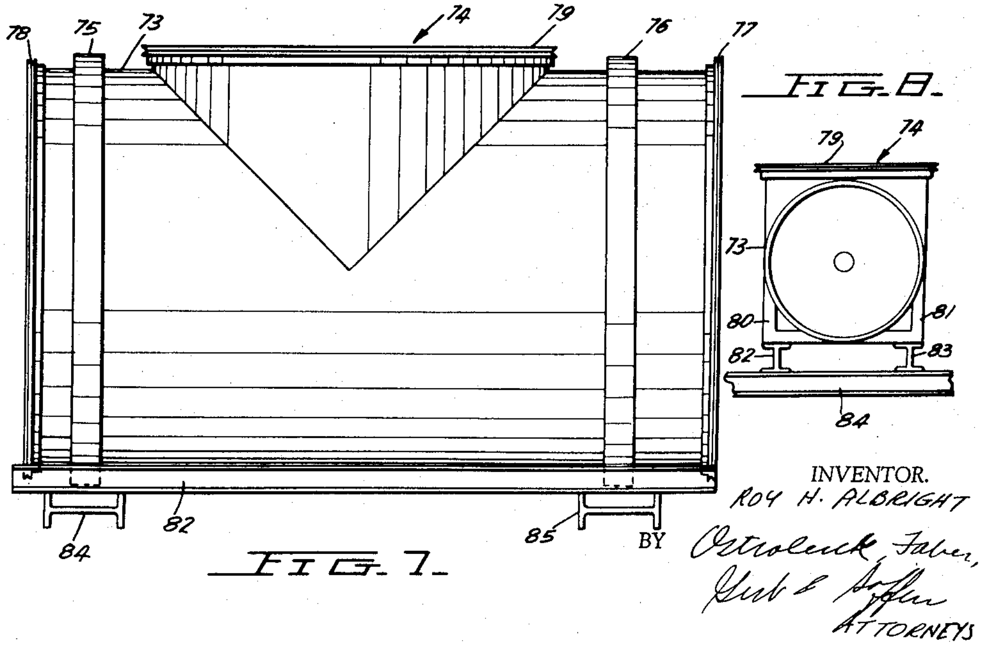
Figure 7 shows a side view of the bus of my novel invention when the bus housing is modified to form a T-connection.
Figure 8 is a front sectional view of Figure 7.

Figures 7 and 8 show a side and front view respectively of a bus housing for providing a T-section as has been shown in Figure 1 for the T-sections 26, 27 and 28. In Figures 7 and 8, this T-section bus housing 73 is provided with an opening indicated generally at 74 for connecting a bus which runs perpendicular to the axis of housing 73. This T-housing is further seen in Figure 7 as having reinforcing members 75 and 76 which are similar to the reinforcing member 48 of Figure 2 and are further provided with end reinforcing members 77 and 78 along the length of the housing and end section 79 for the opening 74 in the side of housing 73.

As will be described more fully hereinafter, these and reinforcing members 77, 78 and 79 are so adapted as to allow connection between the T-shaped bus duct unit of Figures 7 and 8 and adjacent but duct units.

As shown in Figure 8, mounting feet 80 and 81 are connected to the longitudinal support members 82 and 83, respectively, which are in turn connected to the transverse structural member 84 for the ultimate support of bus housing 73. As best seen in Figure 7, a second transverse structural member 85 is provided for further support in coordination with transverse member 84 for supporting the bus housing 73. It is to be noted that the method of adjustably supporting bus housing 73 could be identical to that described in either Figures 2 and 3 or Figures 5 and 6.

During transportation of the bus unit, the bus housing will be subject to stresses which may not appear during installation and operation thereof. So as to further support the end of the bus housing, a bracing member which comprises the radially extending members 86, 87, 88 89, 90 and 91 wherein one end of these members is connected to the end portion 92 of a bus housing while their interior portions are connected to a plate 93 having an aperture 94 therein. The connection of radially extending members 86 through 91 at the end of the bus housing and at the horizontally located plate 93 may be provided by any desired means such as bolts or rivets. This bracing member then provides two functions. The first function is clearly that additional support is given to the end portion 92 of the bus housing. A second function is provided, this being that the aperture 94 in the plate 93 locates the center of the bus supported by insulators 95, 96 and 97 so as to facilitate the alignment between this bus and the bus of an adjacent housing when these two housings are connected on one another. Thus, once the housings are aligned with respect to one another, the bracing members 86 through 91 may be removed from the end portion 92 of the housing and the two adjacent units may then be finally connected together in a manner which will be described hereinafter.

*Connection between adjacent bus housing sections*

In view of the greater inaccuracies in housing dimensions, greater degrees of misalignment and increased expansion and contraction due to temperature changes of a bus housing which must serve to operate under voltages of 138 kilovolts, I have invented a novel means of interconnecting adjacent bus housings. This method of bus housing connection is seen in Figures 9, 10 and 11 where Figure 9 shows an exploded perspective view of the view of the manner in which a housing such as the housing of Figure 2 may be modified. Figure 10 shows a sectional view of the completed junction between two housings, and Figure 11 shows a detailed sectional view of my novel connecting structure.

As seen most clearly in Figure 9, bus housing cover 43 has a ring-shaped member 100 connected to the end thereof at the protruding flange 101 of the ring 100.

Therefore, this ring, as well as serving a part in the interconnection between two adjacent housing sections, further serves as a reinforcing member for the housing to which it is connected. Ring 100 then has a groove 102 cut therein which is adapted to receive a flexible gasket 103 which has a radially extending portion 104 which fits into and is sealed in groove 102 of the ring 100. Gasket 103 is provided with a second radially extending portion 105 which cooperates with a groove similar to groove 102 of a ring housing 42. A plurality of ring-shaped clamps, two of which are seen in Figure 9 as clamps 106 and 107, then extend around the circumference of ring 100 and the ring 109 of the bus housing 108 to be connected to ring 100, these clamps maintaining the ring-shaped portions in mechanical engagement with respect to one another.

This construction may be further seen in Figure 11 where ring 100 has the flange 101 welded to the housing 43 and in a like manner the ring 109 is welded to the housing 108. The gasket 103 then has its radially extending portions 103 and 105 inserted in the grooves.

106 of the ring 100 and 110 of the ring corresponding to the housing 108.

Figure 11 further shows the manner in which the rings 106, 107 and 108 of Figures 9 and 10 are concentrically positioned with respect to the gasket 107 so that extending portion 111 and 112 of ring 107 straddles the shoulders of rings 109 and 101 so as to maintain a mechanical connection between the two housing sections 43 and 108. Once the two housings are positioned with respect to one another, each of the plurality of clamps 106, 107 and 108 may be connected together as by the cooperating screws 113, 114 and 115 which interconnect adjacent ends of clamps 106 and 107. While a single clamping means could have been utilized, it is preferable to use a plurality of clamping means so as to allow a more equal distribution of radial pressure on the bus housing junction.

Rings 109 and 100 of Figure 11 further have an insulating member 116 and 117 which serves to electrically insulate housing members 43 and 108 from one another to thereby contain circulating current within only a single housing.

It is to be noted that gasket 103 has a U-shaped cross-section and that extensions 111 and 112 of clamp 107 is not in direct contact with the shoulder of the rings 100 and 109. It is this novel construction that will allow a change in the distance between the ends of the housing sections 43 and 108 due to thermal contraction and expansion while still forming a mechanical connection therebetween. The U-shaped construction of gasket 103 will allow a moisture-tight connection between the housings 43 and 108 even though these two housings may not be perfectly aligned. After the connection of the plurality of clamps 106, 107 and 108, however, the ends of the two housings 43 and 108 will for all practical purposes be drawn into alignment with one another.

Although clamps 106, 107 and 108 of Figure 10 are seen to be electrically insulated from housings 108 and 43 of Figure 11 by means of insulating spacers 116 and 117, it is to be noted that the clamps 106, 107 and 108 do not intercept the metallic shielding action offered by housings 43 and 108.

Furthermore, as well as performing a mechanical connection between these two adjacent housings and completing the metallic shield, the clamps 106, 107 and 108 protect the gasket 103 from direct sunlight which could cause or accelerate deterioration of the gasket material. Similarly, the clamp protects the gasket material from puncture and also controls the course of water so that there is little chance for moisture to seep into recesses where the gasket is locked into the grooves 102 and 110.

*Insulator support*

In view of the increased physical dimensions of an insulator for supporting a bus from the bus housing when this bus housing is rated at a value of the order of 138 kilovolts, the insulator is subject to severe problems, related to increased stresses due to cantilever forces and adjustment of the insulator position. In order to overcome these problems, I have invented a novel insulator support which is so constructed as to flexibly mount the insulator to decrease the effective bending stress and to further mount the insulator so that its position may be adjusted in both a radial and angular position.

The perspective view of Figure 12 shows a portion of the interior of housing 43 and the insulator 47 which is to be connected to this housing portion. A support base 120 is fastened to the housing portion 43 in any desired manner such as welding in an axial position along the housing 42 so that the base 120 will be in registry with a reinforcing member such as member 48 of Figure 2.

The support base 120 is then provided with four threaded apertures 121, 122, 123 and 124 which will receive the mounting bolts of the insulator 47. The base of insulator 47 is provided with projecting lugs seen in Figure 12 as lugs 125, 126 and 127 through which an adjusting screw and fastening screw protrude where the fastening screws of lugs 125, 126 and 127 cooperate with threaded apertures 121, 124 and 123, respectively.

This particular construction may be further seen in Figures 13 and 14 wherein Figure 13 shows the typical construction of any one of the fastening means carried by the insulator base 47. Thus, the adjusting screw 128 is threaded to cooperate with the thread in lug 126 and has an aperture 129 therethrough for receiving the spacer 103*a* and fastening screw 130 which has threads 131 for cooperating with the threads 124 in the mounting base 123.

Interposed between the head of adjusting screw 128 and fastening screw 130 are the spring type washers 132 and 133. The washers 132 and 133, therefore, operate to bias the end of adjusting screw 128 into engagement with surface 134 of the mounting base 123. Hence, if insulator 47 is now subjected to a counterclockwise bending stress, lug 126 will bring adjusting screw 128 into deflecting engagement with the washers 132 and 133, thereby substantially decreasing the bending stress within insulator 47 in view of the compression of spring means 132 and 133.

In a like manner, a washer connection associated with the fastening screw to the right of insulator 47 will provide the flexible connection for rotation of insulator 47 in a clockwise direction.

In the most general case, it is understood that if insulator 47 were mounted by at least three fastening means of the type shown in Figures 13 and 14, bending stress in any direction will be accommodated by a flexing of insulator 47 to some new angular position. In addition to providing a novel flexibly supported connection for the insulator 47 of Figures 13 and 14, my novel fastening between the insulator and its support housing will allow for adjustment of the insulator position in both a radial and angular direction, in view of the threaded connection between the adjusting screw 128 and lug 126. Hence, if it is desired to adjust the position of insulator 47 in a radial direction so as to increase or decrease the compression thereon, each of the adjusting screws such as adjusting screw 128 for each of the mounting lugs of the insulator merely need be located accordingly.

In a similar manner, the angular position of insulator 47 may be controlled by selectively adjusting the position of one or more adjusting screws with respect to their cooperating insulator support lug.

*Disconnect switch*

A novel disconnect switch to be utilized with the high voltage bus structure described heretofore is shown in conjunction with Figures 15, 16 and 17. Referring first to the perspective view of Figure 15, the disconnect switch is mounted within a housing 136 which has a reinforcing ring 137 thereon to reinforce the housing in the manner described heretofore. In a like manner, mounting feet 138 and 139 are adjustably connected to longitudinal support member 140 while similar mounting feet on the other side of the bus are mounted to the longitudinal support member 141. Longitudinal support members 140 and 141 are then mountable to transverse structural support members for supporting the housing section 136 in the manner described above.

Each end of the housing 136 is then provided with ring members 142 and 143 which will allow connection between the housing 136 and adjacent housing in the manner described hereinbefore in connection with Figures 11, 12 and 13. At the top of housing 136 is connected the disconnect switch operating mechanism housing 144 which supports the switch blade insulator 145 and 146 as will be described more fully in conjunction with Figures 16 and 17. Observation windows 147*a* and 148*a* are then provided in housing 136 so as to indicate the position of the switch blade.

Corona shields 147, 148, 149, 150, 151, 152 and 153 are connected along the switch and its adjacent bus structure as will be described more fully hereinafter.

Thus, the housing construction and the manner in which the two adjacent housings are connected together is the same for the case of disconnect switch housings as was true of the normal bus run housings described heretofore. In a like manner, the insulators of the disconnect switch housing are flexibly and adjustably connected to the housing wall as described above in conjunction with Figures 12, 13 and 14.

As seen in Figures 16 and 17, bus bars 154 and 155 are provided with ends 156 and 157, respectively, at the ends in the shape of rounded tongues. Rounded tongues 156 and 157 cooperate with jaw ends 158 and 159 of the switch blade 160. Switch blade 160 is then rigidly connected to insulators 146 and 145 which are in turn connected to the channel member **160*a*. Channel member 160*a* is then slidably connected to guide posts such as the guide posts 161 and 162 of Figure 16 which guide the motion of channel 160*a* when the operating screws 163 and 164 are rotated by the operating mechanism 165**.

Hence, upon rotation of mechanism 165, screws 163 and 164 are rotated to draw channel **160*a* and its support insulators 145 and 146 and the switch blade 160** to the dotted position shown shown in Figure 16 to thereby completely open the disconnect switch.

The corona rings 147 through 153 serve to reduce corona discharge and to raise the insulation level. It is seen that these corona rings are arranged on each side of the insulators so as to shield conductor parts, raised parts and insulator members supporting these part. These rings along with all other conductor members are made with large sectional radii so as to reduce the intensity of the electric field at the surface of the ring and conductors. Furthermore, the corona rings are made concentric so that a uniform electric field exists at the periphery thereof.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A disconnect switch for a high voltage metal enclosed bus structure comprising a metal housing, a bus, insulating support means; and a switch blade movable into and out of series connected engagement with said bus; said insulating support means being mounted on said housing to support said bus from said housing in insulated relationship therewith; said housing comprising a cylindrical continuous body having an annular shaped reinforcing member fastened to the periphery thereof; said annular shaped reinforcing members being coaxial with the position of said insulating support means to thereby impart rigidity to said housing at a point of highest stress; mounting members for mounting said housing on a support structure; said mounting members being fastened to said annular shaped reinforcing member and a disconnect switch operating means; said disconnect switch operating means being connected to said switch blade for moving said switch blade into and out of engagement with said bus by moving said blade perpendicular to the longitudinal axis thereof.

2. A disconnect switch for a high voltage metal enclosed bus structure comprising a metal housing, a bus, a switch blade movable into and out of series connected engagement with said bus; and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery therefor for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting member of each of said annular shaped reinforcing members being fastened to a common longitudinal structural member; said longitudinal structural member being constructed to be connected to transverse structural members for supporting said bus structure; and a disconnect switch operating means; said disconnect switch operating means being connected to said switch blade for moving said switch blade into and out of engagement with said bus; and means operatively connected to said switch blade for movement thereof perpendicular to its longitudinal axis.

3. A disconnect switch for a high voltage metal enclosed bus structure comprising a metal housing having a bus and switch blade movable into and out of engagement therewith, supported therein in insulated relation with said metal housing; said housing comprising a cylindrical continuous body having an annular shaped reinforcing member fastened to the periphery thereof for imparting rigidity to said housing; said annular shaped reinforcing member being further positioned at one end of said housing and being constructed to receive gasket and clamping means for connecting said housing to an adjacent bus housing; said switch blade having corona shields disposed coaxially therewith; the bus portions adjacent said switch blade having further corona shields disposed coaxially therewith; and means operatively connected to said switch blade for movement thereof perpendicular to its longitudinal axis.

4. A disconnect switch for a high voltage enclosed bus structure comprising a metal cylindrical housing and disposed therein a pair of spaced apart buses positioned in axial alignment; said buses being coaxial with said housing and insulated therefrom; an elongated switch blade movable perpendicular to the longitudinal axis thereof into and out of engagement with said buses; each of said buses having a rounded tongue secured thereto at an end thereof; jaw means at each end of said switch blade engageable with said rounded tongues and when so engaged completing a series connection between said buses through said switch blade.

5. A disconnect switch for a high voltage enclosed bus structure comprising a metal cylindrical housing and disposed therein a pair of spaced apart buses positioned in axial alignment; said buses being coaxial with said housing and insulated therefrom; an elongated switch blade movable perpendicular to the longitudinal axis thereof into and out of engagement with said buses; each of said buses having a rounded tongue secured thereto at an end thereof; jaw means at each end of said switch blade engageable with said rounded tongues and when so engaged completing a series connection between said buses through said switch blade; elongated insulator means secured at a first end thereof to said switch blade and extending perpendicular to the longitudinal axis of said switch blade; means connected to said insulator means at a second end thereof for moving said insulator means along its longitudinal axis; means external of said cylindrical housing for journaling the movement of said insulator means.

References Cited in the file of this patent

UNITED STATES PATENTS 2,771,529 Kostriza -------------- Nov. 20, 1956
2,813,179 Rugg ----------------- Nov. 12, 1957